March 12, 1929. O. MILLER 1,704,801
PLANT PROTECTOR
Original Filed Jan. 11, 1927
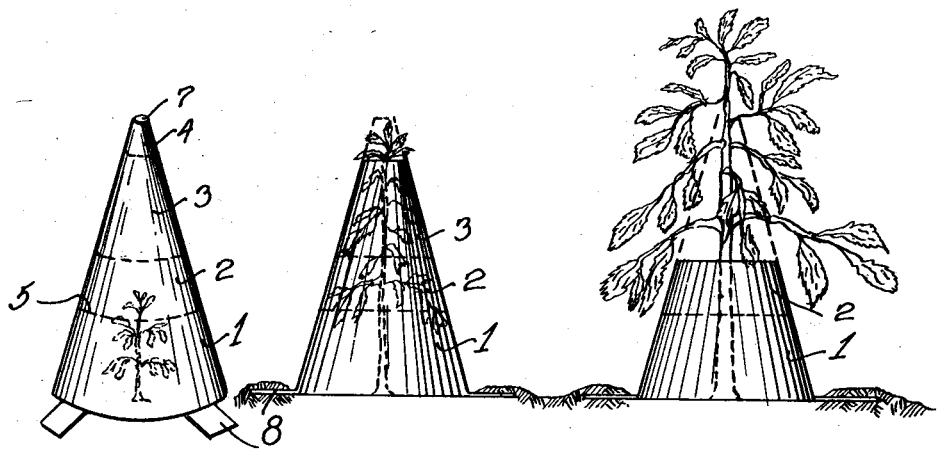
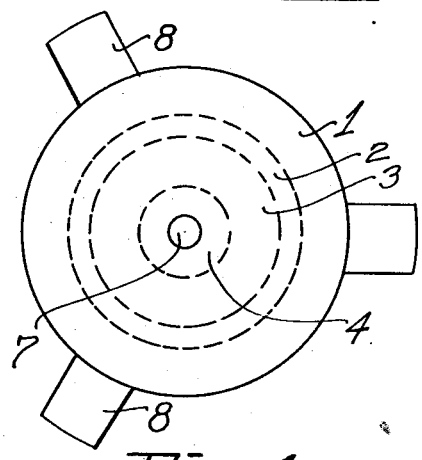
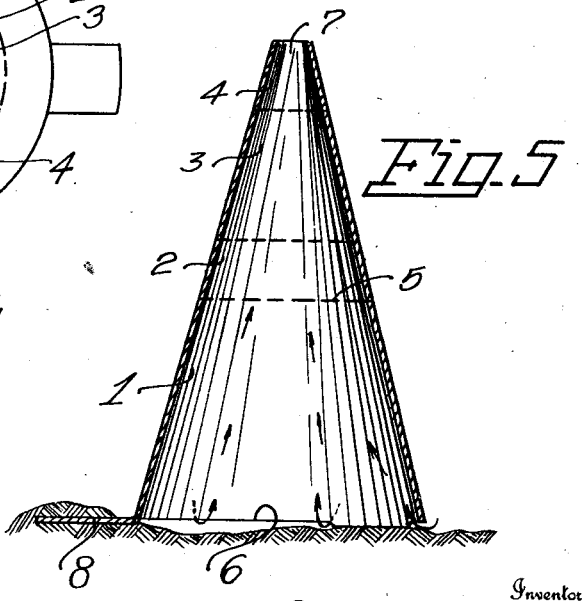
Oscar Miller, Inventor
By Herbert E. Smith, Attorney Patented Mar. 12, 1929.

1,704,801

UNITED STATES PATENT OFFICE.

OSCAR MILLER, OF SPOKANE, WASHINGTON, ASSIGNOR OF ONE-HALF TO F. M. MITCHELL, OF SPOKANE, WASHINGTON.

PLANT PROTECTOR.

Application filed January 11, 1927, Serial No. 160,390. Renewed August 1, 1928.

My present invention relates to an improved plant protector for use in plant husbandry by gardeners and others, and is utilized as a hot house for the protection of single or individual plants. The device of my invention is particularly useful as a shield or protection for young or delicate plants in their early growth, and to protect plant life from frost, heavy rainfalls, drouth, wind and other elements of the weather that might injure the plant or retard its growth.

The device comprises a protector or cover, preferably of cone shape and fashioned of semi-transparent or opaque material that is tough, strong, durable and thin, through which the sun's rays may penetrate to warm the atmosphere within the protector or cover for promoting the plant life.

Means are provided whereby the height of the protector may be reduced to accommodate the growing plant as the height of the plant and the spread of its branches increases, and for this purpose the protector or cover is made up in sections which may successively be dispensed with, starting at the top, to conform to the growth of the plant. The final or base section of the cover or protector may be retained and employed as a permanent band for the season to protect the plant roots from the sun, for the exclusion of insects and worms, and for retaining moisture in the soil for the roots.

The invention consists in the novel combinations of parts as hereinafter more fully set forth. In the accompanying drawings I have illustrated one complete example of the physical embodiment of my invention wherein the parts are combined according to the best mode I have thus far devised for the practical application of the principles of my invention.

Figure 1 is a view of the protector or single hot house enclosing a small plant in its first stages of growth.

Figure 2 is a view in side elevation showing the plant at a larger growth and the top section or band of the protector or cover removed to accommodate the growing plant.

Figure 3 is a view of the cover with only two remaining sections, and the plant shown with its branches outspreading beyond the cover.

Figure 4 is an enlarged top plan view of one of the covers or protectors.

Figure 5 is a vertical sectional view of the cover or protector showing one of its feet or tabs anchored beneath the soil and indicating by arrows the movement of air currents in ventilating the interior of the protector.

In the preferred form of my invention the protector is made in the form of a cone from semi-transparent or opaque material as paper, parchment or other suitable material that is strong, tough, durable, and capable of permitting passage therethrough of the sun's rays. The protector is fashioned with a plurality of sections or bands, the number of which may be increased or diminished from the four here shown. These sections or bands are designated as 1, 2, 3, 4, and the adjoining bands are divided by spaced, annular series of perforations 5 that permit the top section to be torn off from the body of the protector leaving a clean edge. As indicated in the drawings the top or uppermost section is removed until only the base section remains, or the number of sections to be removed may be varied depending upon the requirements of the plant.

The protector has a large opening 6 for the base section 1, and a smaller opening 7 in the top section, and tabs or feet 8 are used to anchor the protector by having placed thereon a sufficient quantity of soil to hold the protector in stable position. As seen in Figure 5 circulation of air may be provided for by removing some of the soil about the lower circumferential edge of the protector to permit ingress of air currents to ventilate the interior of the protector or cover.

The protector is used as illustrated in Figures 1, 2, 3, the uppermost sections being torn off as the size of the plant increases, until the two lower sections, or the base section, only, remain as required.

Having thus fully described my invention, what I claim as new and desire to secure by Letters Patent is:—

1. A plant protector comprising a plurality of sections adapted to be successively torn off, and anchoring means on the base section to retain the protector in stable position.

2. A cone shaped plant protector open at the top and bottom and comprising a plurality of sections having spaced annular series of perforations between adjoining sections, and means on the base section adapted to be weighted down by soil for the purpose described.

In testimony whereof I affix my signature.

OSCAR MILLER.